Feb. 14, 1961     L. C. CUNNIFF     2,972,103
PORTABLE RECORDING INSTRUMENT

Filed Oct. 31, 1957     2 Sheets-Sheet 1

INVENTOR.
Leo C. Cunniff
BY Charles H. Brown
ATTORNEY

INVENTOR
Leo C. Cunniff
BY Charles H. Brown
ATTORNEY

United States Patent Office 2,972,103
Patented Feb. 14, 1961

2,972,103

PORTABLE RECORDING INSTRUMENT

Leo C. Cunniff, Cedar Grove, N.J., assignor to Industrial Instruments, Inc., Cedar Grove, N.J., a corporation of New Jersey Filed Oct. 31, 1957, Ser. No. 693,667

6 Claims. (Cl. 324—30)

This invention concerns a portable, lightweight, battery-operated recording instrument for recording the characteristics of a variable of a physical, chemical or electrical nature, such as pressure, temperature, humidity, fluid flow speed, electrolytic conductivity, etc. The instrument of the invention is especially useful at those locations where electrical power is not available, for example, in the case of recording electrolytic conductivity, at streams and rivers for measuring the characteristics of the water.

An important feature of the invention is the highly economical and novel overall arrangement and selection of components for reducing weight and minimizing power consumption. A spring (hand)-wound clockwork mechanism is used for driving the recording chart, thereby avoiding power consumption. Completely transistorized electronic circuitry greatly minimizes battery drain as compared to conventional recording instruments. A fabric belt and spring-loaded nylon loop are employed to eliminate back lash and reduce inertia, as contrasted with the cams and gears used in conventional recording instruments. The overall arrangement includes a sensitive null-seeking relay and a reversible direct current motor and results in a portable recording instrument which for the first time can measure liquid conductivity and temperature without the need for electric line power, and possesses economy advantages in manufacture.

Other features and advantages will appear from a reading of the following description, which is accompanied by a drawing, wherein.

Although the recording instrument of the invention is described hereinafter with especial reference to its use for recording electrolytic conductivity, it should be understood that the instrument is not limited to this specific application but has much broader use for recording the characteristics of any variable of a physical, chemical, or electrical nature where the change to be recorded can be translated into a change in resistance of a suitable transducer.

Figure 1:
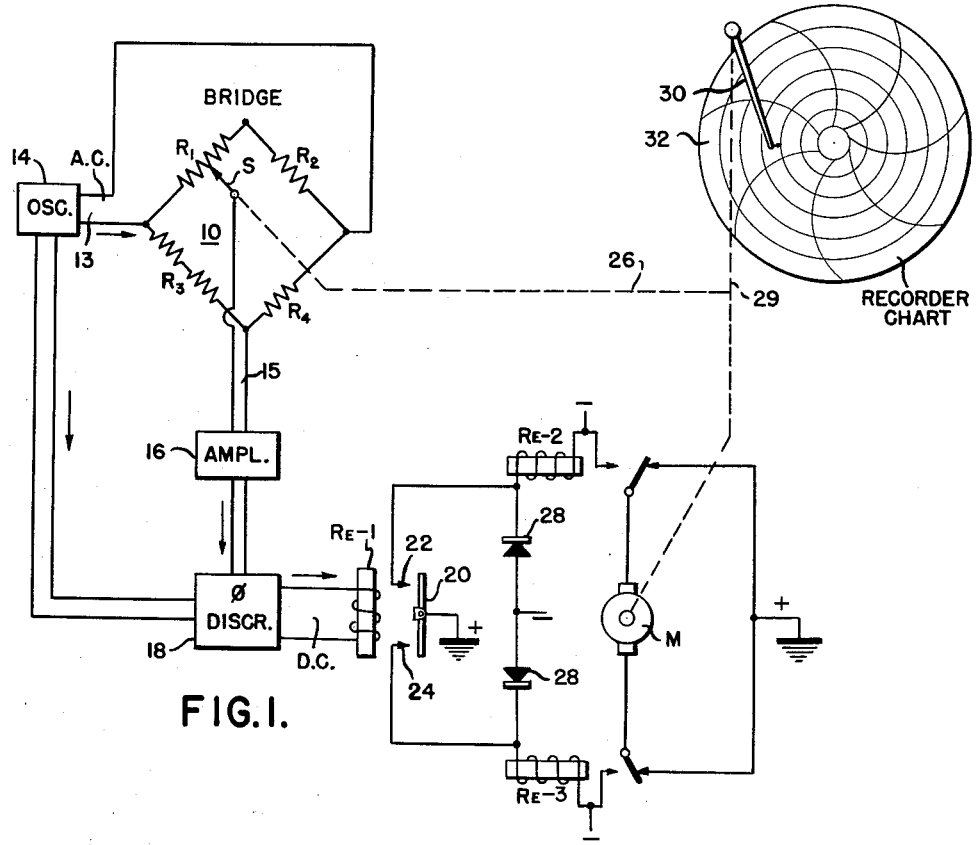
Fig. 1 is a circuit diagram, generally in block form, of the recording instrument of the invention; and illustrates how the Wheatstone bridge slide wire and the recorder pen are simultaneously driven by the electric motor.
Figure 2:
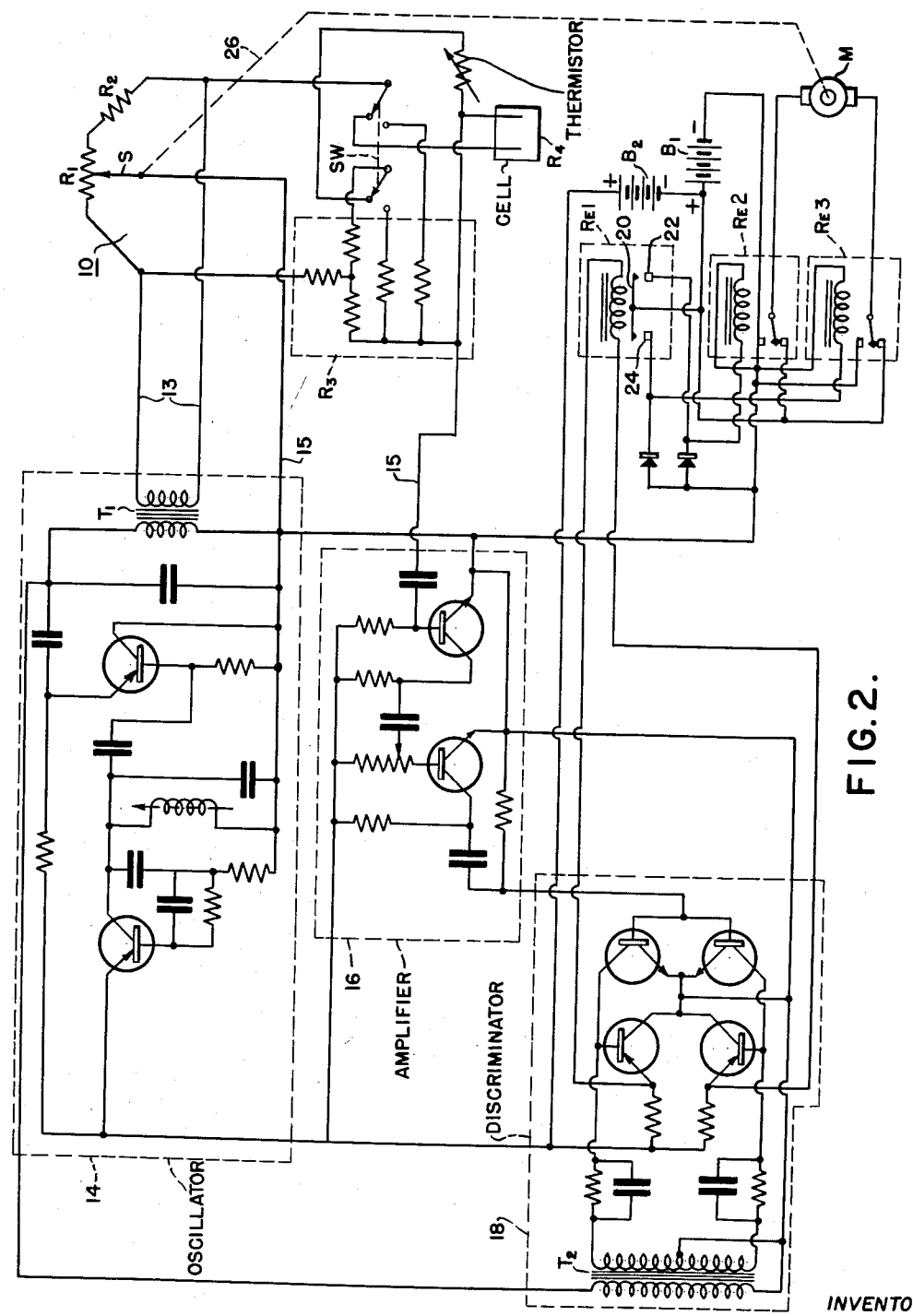
Fig. 2 shows the detailed electrical circuitry of the instrument.

Referring to Figs. 1 and 2 in more detail, the recording instrument of the invention includes a Wheatstone bridge 10 having, in effect, four resistance arms R1, R2, R3 and R4. Resistance R1 is provided with a slide wire S which is in contact with and adjustable over the length of R1. Resistance arm R3 is actually a network assembly of three fixed resistors and a temperature-responsive resistor, such as a thermistor. Resistance arm R4 is actually a conductivity cell in the form of two spaced electrodes between which the liquid being tested forms a conductive path. Both the thermistor and the conductivity cell are mounted in an immersion unit electrically connected to the bridge by a multi-conductor cable. This cable can be as long as 100 to 300 feet. The resistance of the thermistor varies according to the temperature of the liquid in which the immersion unit containing both the thermistor and the cell R4 is immersed. The circuit is arranged so that the conductivity (or resistance) of the bridge arm including the thermistor varies with the temperature of the solution in such a way as to balance out, automatically, the variations in conductivity (or resistance) of the solution due to temperature and provide an accurate indication of electrolytic conductivity or resistance.

The bridge operates on the self balancing principle and is fed across one diagonal by 1000 cycles per second alternating current (A.C.) from the two-stage transistorized oscillator 14, by way of leads 13. The output from the bridge is taken off, effectively, by way of leads 15, from the other diagonal of the bridge and is amplified in two-stage, transistorized amplifier 16. It should be noted that one of the leads 15 is connected to the slide wire S of arm R1 of the bridge. Both the amplifier 16 and the oscillator 14 feed separate inputs of the four-stage transistorized phase discriminator 18. This discriminator distinguishes between the phase of the bridge input and output signals. As bridge balance is passed over, the output signal from the bridge shifts phase approximately 180 degrees with respect to the input signal. Discriminator 18 produces a direct current (D.C.) output which is approximately zero volts at bridge balance and a plus or minus D.C. value depending on the direction of bridge unbalance.

The D.C. output from the discriminator is fed to the winding of relay RE-1 which is a null seeking relay. It is a sensitive relay which has an armature 20 pivoted at its center and normally disengaged from a pair of make contacts 22 and 24 oppositely disposed relative to the pivot point of the armature. Armature 20 engages either contact 22 or contact 24 depending on the polarity of the voltage applied to the winding of relay RE-1 by the phase discriminator. Normally, both contacts 22 and 24 are open when the Wheatstone bridge 10 is at balance. Depending on the direction of unbalance of the bridge, the relay RE-1 will cause one or the other of contacts 22, 24 to close.

Relays RE-2 and RE-3 are slave relays which alternatively operate when armature 20 of relay RE-1 engages contacts 22 and 24, respectively. Either relay RE-2 or relay RE-3 will become energized and operate depending on the direction of unbalance of the bridge. These relays are sturdier relays than RE-1 and can withstand the necessary motor load current better than relay RE-1, and, as arranged, isolate relay RE-1 from the motor load. They also provide for reversal of the D.C. motor M and make possible the use of a single battery for motor power.

The reversible direct current motor M is connected to and controlled by the relays RE-2 and RE-3. One lead from motor M is connected to the armature of relay RE-2 while the other lead from motor M is connected to the armature of relay RE-3. Each of these relays is provided with a make and a break contact. The make contacts are connected to the negative terminal of a 6 volt battery. The break contacts are connected to a point of reference potential, herein illustrated by way of example as ground, but which actually is the positive terminal of the same 6 volt battery. The operation of relay RE-2 will cause the motor M to run in one direction, while the operation of relay RE-3 will cause motor M to run in an opposite direction over obvious electrical paths. The circuit wiring is such that the motor will not run when the bridge 10 is at balance, but will run in either direction depending on the direction of bridge unbalance. The motor M has its drive shaft coupled by a mechanical link, shown in dotted lines 26, to the slide wire S of resistor R1 so as to restore bridge balance.

It should be noted that when both relays RE-2 and RE-3 are not operated both connections to the motor M are grounded or short-circuited via the break contacts of these relays. This feature helps to brake the motor and stop it by applying a back E.M.F. to the windings thereof in a direction to oppose rotation as the null position of the bridge is approached.

Also linked to the drive shaft of motor M by a mechanical link, shown by dotted lines 29, is the pen arm 30 of a spring-wound clock chart drive mechanism. The recording chart of this mechanism is designated 32.

Rectifiers 28, 28 serve to reduce arcing across the contacts of relay RE-1. These rectifiers may be germanium or selenium.

Fig. 2 illustrates in more detail the transistorized electronic corcuitry. The same parts of Figs. 1 and 2 have been designated by the same reference characters. The oscillator 14, in effect, includes an oscillator stage and a buffer amplifier stage. The buffer minimizes the effect on the oscillator of bridge variations. The output of the oscillator 14 feeds the bridge 10 over an output transformer T1, and feeds the phase discriminator 18 over another transformer T2.

The bridge 10 is provided with a check switch SW to enable the substitution of fixed resistors for both cell R4 and the thermistor for calibration checking. The entire instrument is powered from two 6 v. batteries B1 and B2. One heavy duty 6 v. battery B1 is used to power the motor M while both the heavy duty battery and the smaller batery B2 in series are used as the 12 volt supply for the transistor circuitry.

Figure 3:
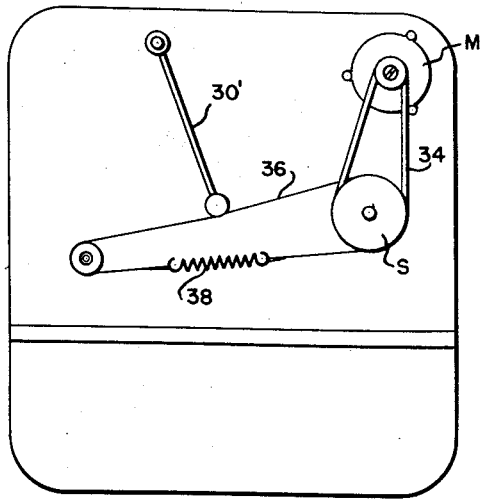
Fig. 3 is a fragmentary showing of the rear of the instrument with the back cover removed, to indicate the manner in which the electric motor drives the pen of the recording instrument and the slide wire on the Wheatstone bridge.

Fig. 3 shows the linkage between the motor M and both the slide wire S and the pen of the recorder mechanism, as seen from the rear of the instrument. A fabric belt 34 is used to drive the slide wire pulley from the motor M. The slide wire pulley, in turn, is linked to the pen drive arm 30' by means of a nylon loop 36 which is spring-loaded by a very lightweight coil spring 38. The fabric belt and the nylon loop reduce and minimize the inertia caused by the moving weight of the conventional gear arrangements. They also eliminate back lash which occurs when conventional cams and gears move.

The recording instrument of the invention is characterized by lightness in weight and a minimum of power consumption. The novel circuitry keeps the current drawn from the batteries to less than 8.0 milliamperes at 12 volts D.C. when the instrument is not rebalancing, and to approximately 600 milliamperes at 6 volts D.C. when the instrument is operating during the rebalancing interval. The instrument provides a direct reading in micromhos and may be supplied with a wide variety of ranges. Measurements of electrolytes ranging from distilled or demineralized water to strong acids can be made. In the embodiment of the invention constructed and successfully tested, the instrument was housed in a drawn aluminum carrying case with a handle. The case was gasketed and of splashproof construction, and had dimensions approximately 13⅞" high by 11⅝" wide by 9½" deep. The chart was circular with intervals of 1 hour, 1 day or 7 days, and was 10 inches in diameter. All transistor stages 14, 16 and 18 and also the thermistor network were small, lightweight plug-in units. One of the 6 v. batteries was a Burgess 4F4H or equivalent, while the other was an Eveready No. 744 or equivalent.

The instrument of the invention may be used to record variations in any variable which can be translated into variations in resistance. For example, if it is desired to record temperature, the conductivty cell should be replaced with a thermistor or any suitable material which changes its resistance with change in temperature, in which case the temperature compensation feature of the circuit of Fig. 2 will not be required. In recording wind speed, humidity, pressure, or volume, any suitable transducer can be used in place of the conductivity cell as long as its resistance changes as a function of change in the variable to be recorded. Transducers can be chosen which are responsive to alternating current (A.C.) or direct current (D.C.) signals which, in turn, vary in accordance with variations in magnitude of the variable.

I claim:

1. A portable batery-operated self-balancing recorder instrument comprising an A.C. Wheatstone bridge having a first risistor arm, a second resistor arm directly connected thereto, a third resistor arm and a transducer for the fourth arm, said transducer being characterized by its ability to translate variations in the variable to be recorded into variations in resistance, a moveable slide or tap on said first resistor arm, a transistorized oscillator, a transistorized buffer stage coupled to the oscillator and supplying alternating current to one diagonal of the bridge, a transistorized amplifier coupled to and taking off output from the other diagonal of the bridge, one connection from said amplifier being to said slide or tap, a transistorized phase discriminator, connections to said discriminator from both said oscillator and amplifier, said discriminator serving to convert phase differences in the signals supplied thereto by said ascillator and amplifier to direct current voltages, relay means including a sensitive null-seeking relay coupled to the output of said discriminator and responsive to voltages of different polarities in the output of said discriminator, a direct current reversible motor coupled to and controlled by said relay means, a spring-wound clock-work chart mechanism having a pen, and mechanical linkages between the shaft of said motor and said pen and said slide, whereby the rotation of said motor is always in such direction as to restore bridge balance, and a pair of batteries for supplying power to said instrument, and circuitry under control of said relay means for supplying power to said motor from only one of said batteries, and for supplying power to said transistorized oscillator, amplifier and discriminator from both of said batteries in series.

2. A portable battery-operated self-balancing recorder instrument comprising an A.C. Wheatstone bridge having a first impedance arm, a second impedance arm directly connected thereto, a third impedance arm and a transducer for the fourth arm, said transducer being characterized by its ability to translate variations in the variable to be recorded into variations in impedance, a moveable slide or tap on said first resistor arm, a transistorized oscillator coupled to and supplying alternating current to one diagonal of the bridge, a transistorized amplifier coupled to and taking off output from the other diagonal of the bridge, one connection from said amplifier being to said slide or tap, a transistorized phase discriminator, connections to said discriminator from both said oscillator and amplifier, said discriminator serving to convert phase differences in the signals supplied thereto by said oscillator and amplifier to direct current voltages, relay means coupled to the output of said discriminator and responsive to voltages of different polarities in the output of said discriminator, a direct current reversible motor coupled to and controlled by said relay means, a spring-wound clock-work chart mechanism having a pen, and mechanical linkages between the shaft of said motor and said pen and said slide, whereby the rotation of said motor is always in such direction as to restore bridge balance, a battery for supplying power to said motor, said relay means including a first sensitive null-seeking relay having a winding coupled to the output of the discriminator, an armature pivoted at its center and two make contacts oppositely disposed relative to the pivoted center, second and third relays connected to said make contacts of said first relay and alternatively controlled by the operation of said first relay, each of said second and third relays having an armature, a break and a make contact, said motor having two leads respectively coupled to the two armatures of said second and third relays, a connection from one terminal of said battery to both make contacts of said third and second relays, and a connection from the other terminal of said battery to both break contacts of said last two relays, and circuitry including another battery in series with said first battery for supplying power to said transistorized oscillator, amplifier and phase discriminator.

3. A portable, battery-operated, light-weight conductivity recorder instrument comprising an A.C. Wheatstone bridge having a first resistor arm, a second resistor arm directly connected thereto, a network containing a thermistor for the third arm and an electrical conductivity cell for the fourth arm, a movable slide or tap on said first resistor arm, a transistorized oscillator, a transistorized buffer stage coupled to said oscillator and supplying alternating current to one diagonal of the bridge, a transistorized amplifier coupled to and taking off output from the other diagonal of the bridge, one connection from said amplifier being to said slide or tap, a transistorized phase discriminator, connections to said discriminator from both said oscillator and amplifier, said discriminator serving to convert phase differences in the signals supplied thereto by said oscillator and amplifier to direct current voltages, relay means including a sensitive null-seeking relay coupled to the output of said discriminator and responsive to voltages of different polarities in the output of said discriminator, a direct current reversible motor coupled to and controlled by said relay means, a spring-wound clock-work chart mechanism having a pen, and mechanical linkages between the shaft of said motor and said pen and said slide, whereby the rotation of said motor is always in such direction as to restore bridge balance, and a pair of batteries for supplying power to said instrument, circuitry under control of said relay means for supplying power to said motor from only one of said batteries and for supplying power to said transistorized oscillator, amplifier and discriminator from both of said batteries in series.

4. A portable battery-operated conductivity recorder instrument as defined in claim 3, wherein both said thermistor and said conductivity cell are mounted in an immersion unit and connected to said bridge by a length of cable, the thermistor being chosen and arranged so that it varies with the temperature of the solution being measured in such a way as to balance out automatically the variations in conductivity of the solution due to temperatures, and wherein the mechanical linkage between said motor and said pen includes a nylon spring-loaded loop, and the mechanical linkage between said motor and said slide includes a fabric belt, one of said batteries being a heavy duty 6 volt battery while the other battery is a lighter battery.

5. A portable instrument as defined in claim 3, wherein said relay means includes a first sensitive null seeking relay having a winding coupled to the output of the discriminator, an armature pivoted at its center and two make contacts oppositely disposed relative to the pivoted center, second and third sturdier relays connected to said make contacts of said first relay and alternatively controlled by the operation of said first relay, each of said second and third relays having an armature, a break and a make contact, said motor having two leads respectively coupled to the two armatures of said second and third relays, a connection from one terminal of one of said batteries to both make contacts of said third and second relays, and a connection from the other terminal of said one battery to both break contacts of said last two relays.

6. A portable, battery-operated, light-weight conductivity recorder instrument operating on a minimum of power consumption comprising, an A.C. Wheatstone bridge having a first resistor arm, a second resistor arm directly connected thereto, a network containing a thermistor for the third arm and an electrical conductivity cell for the fourth arm, a movable slide or tap on said first resistor arm, a transistorized two-stage oscillator including a buffer stage coupled to and supplying 1000 cycles alternating current to one diagonal of the bridge, a two-stage transistorized amplifier coupled to and taking off output from the other diagonal of the bridge, one connection from said amplifier being to said slide or tap, a transistorized four-stage phase discriminator, connections including transformers for supplying signals to said discriminator from both said oscillator and amplifier respectively, said discriminator serving to convert phase differences in the signals supplied thereto by said oscillator and amplifier to direct current voltages, relay means coupled to the output of said discriminator and responsive to voltages of different polarities in the output of said discriminator, a direct current reversible motor coupled to and controlled by said relay means, a spring-wound clock-work chart mechanism having a pen, and mechanical linkages between the shaft of said motor and said pen and said slide, whereby the rotation of said motor is always in such direction as to restore bridge balance, a battery for supplying power to said motor, said relay means including a first sensitive null-seeking relay having a winding coupled to the output of the discriminator, an armature pivoted at its center and two make contacts oppositely disposed relative to the pivoted center, second and third sturdier slave relays connected to said make contacts of said first relay and alternatively controlled by the operation of said first relay, each of said second and third relays having an armature, a break and a make contact, said motor having two leads respectively coupled to the two armatures of said second and third relays, a connection from one terminal of said battery to both make contacts of said third and second relays, and a connection from the other terminal of said battery to both break contacts of said last two relays, and a light-weight aluminum splash-proof housing for said instrument, said housing being in the form of a carrying case having a handle.

References Cited in the file of this patent

UNITED STATES PATENTS

| | | |
|---|---|---|
| 1,732,711 | Boddie | Oct. 22, 1929 |
| 2,065,702 | Hubbard | Dec. 29, 1936 |
| 2,397,038 | Obenshain et al. | Mar. 19, 1946 |
| 2,404,227 | Hall | July 16, 1946 |
| 2,422,873 | Wolfner | June 24, 1947 |
| 2,468,843 | Sunstein | May 3, 1949 |
| 2,492,472 | Fortesque | Dec. 27, 1949 |
| 2,537,498 | Wickesser | Jan. 9, 1951 |
| 2,621,235 | Jewell | Dec. 9, 1952 |
| 2,623,206 | Hornfeck | Dec. 23, 1952 |
| 2,824,283 | Ellison | Feb. 18, 1958 |
| 2,870,393 | Whitehead | Jan. 20, 1959 |

OTHER REFERENCES

Instruments, vol. 24 (June 1951), pages 710–715.